United States Patent
Mueck et al.

(10) Patent No.: US 7,732,721 B2
(45) Date of Patent: Jun. 8, 2010

(54) NICKEL ALLOY PRECISION FORCE TRANSDUCER WITH STRAIN GAUGE ELEMENTS

(75) Inventors: Tanja Mueck, Langelsheim (DE);
Volker Relling, Bad Segeberg (DE);
Werner Schulze, Goettingen (DE);
Michael Steps, Hamburg (DE); Helga Covic, Goettingen (DE)

(73) Assignee: Sartorius AG, Goettingen (DE)

( * ) Notice: Subject to any disclaimer, the term of this patent is extended or adjusted under 35 U.S.C. 154(b) by 0 days.

(21) Appl. No.: 12/137,983

(22) Filed: Jun. 12, 2008

(65) Prior Publication Data

US 2008/0236300 A1    Oct. 2, 2008

Related U.S. Application Data

(63) Continuation of application No. PCT/EP2006/011272, filed on Nov. 24, 2006.

(30) Foreign Application Priority Data

Dec. 16, 2005    (DE)    .................. 10 2005 060 106

(51) Int. Cl.
G01G 3/14    (2006.01)
G01G 3/12    (2006.01)

(52) U.S. Cl. ..................... 177/211; 177/229

(58) Field of Classification Search .............. 177/211, 177/229
See application file for complete search history.

(56) References Cited

U.S. PATENT DOCUMENTS

| 4,747,456 | A | * | 5/1988 | Kitagawa et al. | ............. 177/211 |
| 5,610,343 | A | * | 3/1997 | Eger et al. | ............. 73/862.628 |
| 5,929,390 | A | * | 7/1999 | Naito et al. | .................. 177/211 |
| 6,409,845 | B1 | | 6/2002 | Tellenbach | |
| 7,364,020 | B2 | | 4/2008 | Ante et al. | |
| 2005/0023048 | A1 | * | 2/2005 | Selig | ........................... 177/229 |
| 2005/0140205 | A1 | * | 6/2005 | Ante et al. | .................... 303/20 |

FOREIGN PATENT DOCUMENTS

| DE | 195 11 353 C1 | 7/1996 |
| DE | 198 13 459 A1 | 9/1999 |
| DE | 103 50 085 A1 | 6/2005 |
| JP | 61 010733 A | 1/1986 |

OTHER PUBLICATIONS

"The Strain Gage," Transactions in Measurement and Control. 1998, vol. 3. Putman Publishing Company and Omega Press LLC.*

* cited by examiner

*Primary Examiner*—Lisa M Caputo
*Assistant Examiner*—Punam Patel
(74) *Attorney, Agent, or Firm*—Sughrue Mion, PLLC

(57) ABSTRACT

A precision force transducer having a spring element (1) whose load-dependent deflection is converted into an electrical signal by means of strain gauge elements (10). The spring element (1) is made of a precipitation-hardenable nickel-based alloy with a nickel content in the range of 36 to 60 percent and a chromium content in the range of 15 to 25 percent. The strain gauge elements (10) are composed of a polymer-free layered film system. This makes it possible to produce a precision force transducer that features great accuracy, low creep and low moisture sensitivity.

5 Claims, 1 Drawing Sheet

NICKEL ALLOY PRECISION FORCE TRANSDUCER WITH STRAIN GAUGE ELEMENTS

This is a Continuation of International Application PCT/EP2006/011272, with an international filing date of Nov. 24, 2006, which was published under PCT Article 21(2) in German, and the disclosure of which is incorporated into this application by reference. This application claims priority and benefit of German patent application 10 2005 060 106.5, filed Dec. 16, 2005. The disclosure of this application is also incorporated herein in its entirety.

FIELD AND BACKGROUND OF THE INVENTION

The invention relates to a precision force transducer with a spring element whose load-dependent deflection is converted into an electrical signal using strain gauge elements.

Precision force transducers of this kind are generally known and are described, for example, in German Publication DE 195 11 353 C1.

If the accuracy of this precision force transducer is to be increased, creep and hysteresis in particular are significant problems. One approach to achieve an improvement was to use low creep steel grades subjected to special heat treatments—so-called maraging steels, for example. Nanostructured austenitic steels with block dislocation have also been proposed (German Laid Open Publication DE 198 13 459 A1). Another approach to solve this problem is to use aluminum alloys. Creep of this material is compensated by reverse creep of the conventional strain gauges. Creep of conventional strain gauges is due to the polymer film forming the base layer of the strain gauge and the adhesive used between the strain gauge and the spring element. However, because the temperature dependence of the two creep effects differs, this compensation is successful, at best, in a narrow temperature range. However, all of these known solutions allow a meaningful resolution of the precision force transducer of only approximately 50,000 increments. Thus, if the precision force transducer is used for calibratable scales, only approximately 3×3000 calibratable increments are possible.

Another error effect in conventional strain gauges is the moisture sensitivity of the adhesive layer and the substrate film. High-resolution precision force transducers can be encapsulated against the influence of moisture only to a limited extent because of force shunting. Therefore the moisture sensitivity of a conventional strain gauge is another factor limiting resolution in the construction of precision force transducers.

OBJECT OF THE INVENTION

An object of the invention is to provide a precision force transducer of the above-described type that allows substantially greater accuracy.

SUMMARY OF THE INVENTION

According to one formulation of the invention, the spring element is formed of a precipitation-hardenable nickel-based alloy with a nickel content ranging from 36 to 60 percent and a chromium content ranging from 15 to 25 percent, and the strain gauge elements are formed of a polymer-free layered film system.

The use of precipitation-hardenable nickel-based alloys for spring elements is known per see. For example, German Laid Open Application DE 103 50 085 A1 describes a force sensor for a brake in which a precipitation-hardenable steel—preferably 17-4 PH or Inconel 718—is used as the material of the spring element and in which the strain gauge elements are semiconductor elements made of silicon, which are bonded to the spring element using lead borate glass solder. However, semiconductor strain gauge elements have a high temperature coefficient, so that it is not possible to achieve high accuracy over a wide temperature range with this force sensor. In addition, force coupling using glass solders causes significant internal stresses in the silicon chip because the thermal expansion coefficients of these spring materials differ substantially from those of silicon. Because glass materials tend to flow under the influence of force, substantial creep effects are likely in a glass-containing force transmission system and make it impossible to construct a precision force transducer.

Only by combining the precipitation-hardenable nickel-based alloy, which has very low creep, a modulus of elasticity that is nearly constant over a wide temperature range and high strength, with the polymer-free layered film system as the strain gauge element is it possible to achieve a significant increase in the accuracy of the precision force transducer. Eliminating the polymer-based layer and the adhesive makes this layered film system also highly resistant to creep and moisture. This makes it possible to realize a meaningful resolution of more than 200,000 increments. Thus, the present invention proposes using this class of materials, even though the difficulty in machining this class of materials teaches away from adopting this approach.

The precipitation-hardenable nickel-based alloy is preferably an alloy with a nickel content ranging from 50 to 55 percent and a chromium content ranging from 17 to 21 percent. The alloy standardized under material number 2.4668 of EN 10027-2, for example, belongs to this class of alloys.

The polymer-free layered film system is preferably applied to the spring element using a thin film process, preferably a PVD (physical vapor deposition) or a CVD (chemical vapor deposition) process. The layered film system preferably has the following layer sequence: an insulating film formed of $SiO_2$, $Al_2O_3$ or a similar alloy of an insulating material, an expansion sensitive film formed of a ternary alloy with Ni and Cr as the main components, and finally an optional protective film formed of $SiO_2$, $Al_2O_3$ or a similar alloy of an insulating material. Through appropriate selection of the third alloy component and process management, the ternary NiCr alloy can be adjusted to obtain the lowest possible temperature coefficient of the precision force transducer as a whole.

To be able to produce as many spring elements as possible in a single process step when the strain gauge elements are applied—e.g., by sputtering—the actual spring element is preferably made as small as possible. The ends of the actual spring element are then preferably completed by end pieces, to provide a good fastening mechanism for the precision force transducer and render the force introduction elements adapted to the specific application presented. The actual spring element and the end pieces can be joined by welding or bonding, for example. If the end pieces are made of plastic, they can also be injection molded directly onto the spring element (a process referred to as insert molding).

In an advantageous further refinement, the spring element is formed as a parallel guide. The precision force transducer is then insensitive to fluctuating force introduction points. If the precision force transducer is used as a load cell, a weighing tray can be mounted directly to the force introduction area of the precision force transducer or the associated end piece.

BRIEF DESCRIPTION OF THE DRAWINGS

The invention will now be described with reference to an exemplary embodiment depicted in the figures, in which.

DETAILED DESCRIPTION OF EXEMPLARY EMBODIMENTS

Figure 1:
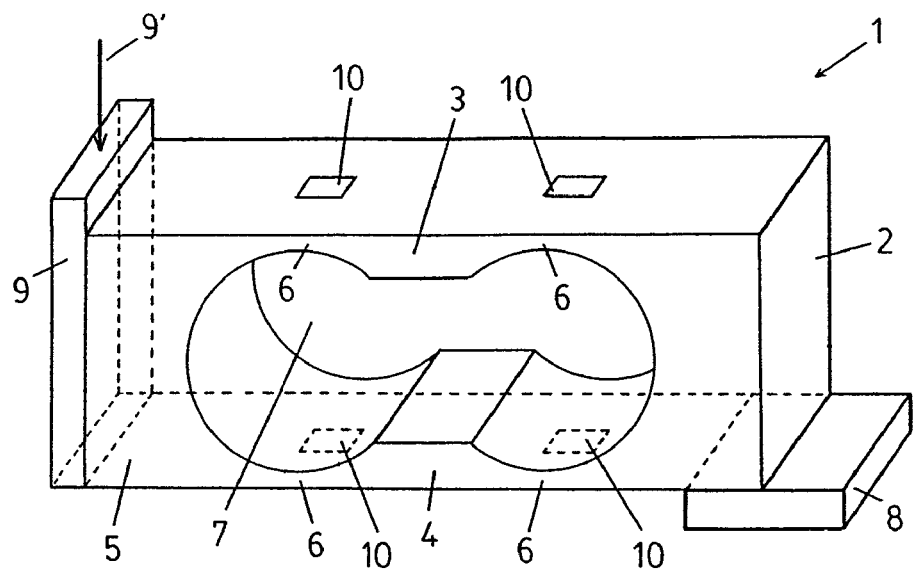
FIG. 1 is a perspective overview of the precision force transducer.

The precision force transducer illustrated in FIG. 1 has a spring element 1, which has an area 2 fixed to a housing, an upper guide 3, a lower guide 4 and a force introduction area 5. The elastic areas of the spring element 1 are primarily the thin points 6. The remaining areas are largely rigid because of their geometric shape. The entire spring element 1 is formed from a single block machined to have an interior cavity 7. The material is preferably a precipitation-hardenable nickel-based alloy with a nickel content in the range of 50 to 55 percent and a chromium content in the range of 17 to 21%. Because this material is difficult to machine, the geometry is selected such that production processes for difficult-to-machine materials can be used, such as wire electric discharge machining. The strain gauge elements 10 are located at the thin points 6. Their structure will be explained in greater detail with reference to FIG. 2. The spring element 1 is mounted to a housing 8, which is indicated only schematically. The force to be measured, which in FIG. 1 is indicated by the force arrow 9', is introduced via an application-specific force introduction part 9, again indicated only schematically in FIG. 1. Because the depicted spring element 1 is configured as a parallel guide, a weighing tray (not depicted) can be mounted directly to the force introduction part 9 if the precision force transducer is used as a load cell.

Figure 2:
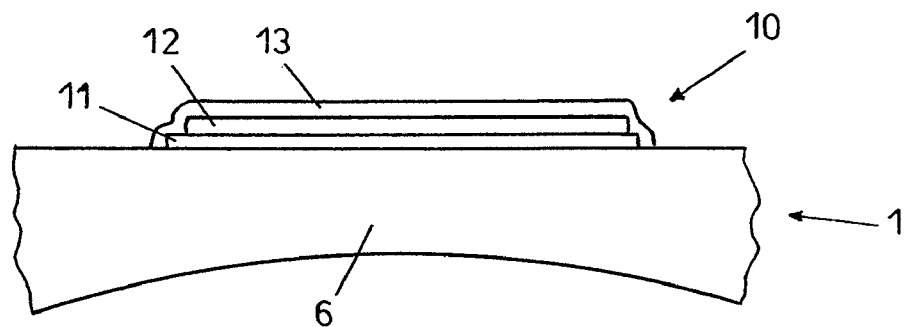
FIG. 2 is a section of the layered film system of the strain gauge element.

Details of the polymer-free strain gauge element 10 are shown in FIG. 2. The strain gauge elements 10 consist of a thin film structure, which is preferably deposited in a PVD or CVD process. The insulating film 11 is applied directly to the spring element and is preferably formed of low porosity $Al_2O_3$, $SiO_2$ or $Si_2N_3$ deposited in a plasma deposition process. With deposition the exact composition varies so that the finished insulating film often does not have the precise stoichiometric composition. Instead of a single insulating film, several different layers can also be combined. The aim is to obtain reliable insulation between the spring element and the adjacent strain-sensitive film while minimizing the film thickness. For the strain-sensitive film 12 ternary NiCr alloys are preferred. They can be modified by suitable control of the sputtering process and appropriate selection of the composition of the third alloy component to obtain a temperature dependency of the apparent strain on the proposed spring material that equals zero. An optional cover film 13 of the aforementioned insulating materials can further be deposited as an additional non-interacting film. Because the polymer-free thin film structure consists only of materials that absorb practically no water, the additional cover film may be omitted in many applications.

The films shown in FIG. 2 are not to scale. The individual films of the strain gauge element 10 have thicknesses in the µm range. In contrast, the thickness of the thin points 6 is in the mm range and depends on the load range of the precision force transducer.

FIG. 2 shows only the films that are essential for the functioning of the strain gauge element. The person skilled in the art can readily add the structures necessary for contacting, for example. For the contact structures, a layered film system of sputtered gold and nickel is preferred. The nickel layer also serves as a diffusion barrier to ensure long-term stability of the strain sensitive ternary NiCr layer. Sensor structures of materials that have a large temperature coefficient of electrical resistance are often also applied. This makes it possible to correct a possibly existing temperature coefficient in the precision force transducer as a whole.

Figure 3:
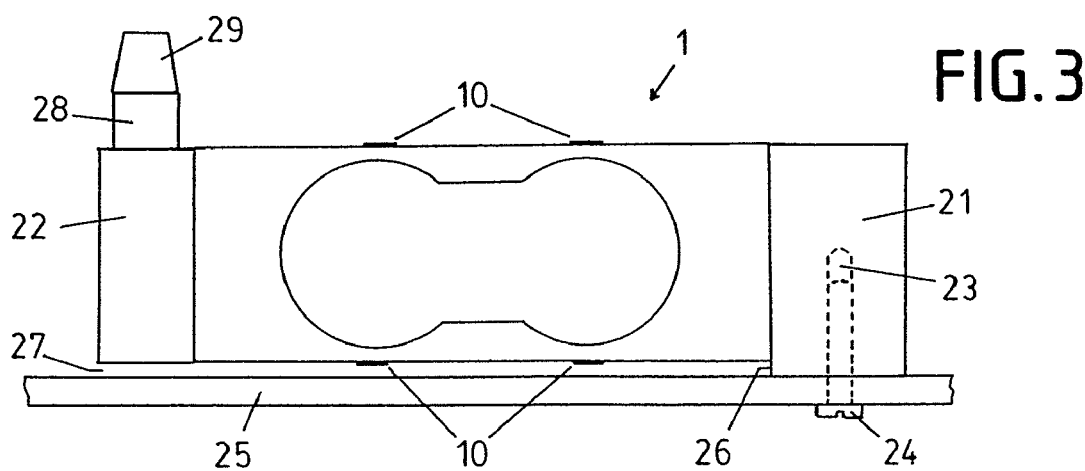
FIG. 3 is a side view of a precision force transducer with end pieces.

FIG. 3 shows a precision force transducer with end pieces 21 and 22 laterally adjacent the spring element 1. The end pieces are preferably made of a material that is more easily machined. As a result, simpler mounting arrangements and more complex shapes can be realized. The end piece 21 has, for example, a threaded bore 23, so that the precision force transducer can be easily screwed to the housing part 25 (screw 24). The lower end of the end piece 21 is slightly longer than the spring element 1 so as to form a projection 26. As a result, the precision force transducer can be easily screwed to the flat housing part 25—e.g., a flat bottom plate—forming a gap 27 which limits the maximum deflection of the spring element 1. The upper end of the other rectangular end piece 22 has a round shank 28 with a conical end 29, to which a conventional round weighing tray (not depicted) can be mounted. The spring element 1 and the end pieces 21 and 22 are preferably joined by welding. However, a bonded joint is also possible because of the relatively large bonding surface and low specific loading. Possible creeping of this bonded surface is non-critical because it does not influence the accuracy of the precision force transducer and because there is only a slight change in the width of the gap 27 and consequently the overload limit. The end pieces can therefore also be made of plastic, which can be injection molded directly onto the spring element 1. This process is known as insert molding. It is also possible to select a different material and/or different joining technology for the end piece 21 than for the end piece 22. Finally, it is also possible to provide only one end piece 21 or 22.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. A precision force transducer comprising:
    a spring element configured to produce a load-dependent deflection; and
    at least one strain gauge element configured to convert the deflection into an electrical signal,
    wherein the spring element is formed of a precipitation-hardenable nickel-based alloy having a nickel content of between 50 and 55 percent and a chromium content of between 17 and 21 percent, and
    wherein the strain gauge element is formed of a polymer-free layered film system,
    the precision force transducer further comprising at least one end piece respectively at least at one end of the spring element, wherein the end piece is formed of a material different from the alloy of the spring element, wherein the end piece is welded to the spring element, and wherein the spring element is configured as a parallel guide.

2. The precision force transducer as claimed in claim 1, wherein the precipitation-hardenable nickel-based alloy has the material number 2.4668 according to EN 10027-2.

3. The precision force transducer as claimed in claim 1, wherein the layered film system for the strain gauge element is sputtered.

4. The precision force transducer as claimed in claim 3, further comprising at least one temperature-dependent sputtered film.

5. A precision force transducer comprising:
- a spring element configured to produce a load-dependent deflection; and
- at least one strain gauge element configured to convert the deflection into an electrical signal, wherein the spring element is formed of a precipitation-hardenable nickel-based alloy having a nickel content of between 36 and 60 percent and a chromium content of between 15 and 25 percent, and wherein the strain gauge element is formed of a polymer-free layered film system, the precision force transducer further comprising at least one end piece respectively at least at one end of the spring element, wherein the end piece is formed of a material different from the alloy of the spring element, wherein the end piece is welded to the spring element, wherein the layered film system for the strain gauge element is sputtered, and wherein the layered film system for the strain gauge element sputtered onto the spring element has the following layer sequence: insulating film of $SiO_2$ or $Al_2O_3$, strain-sensitive film of a ternary NiCr alloy, cover film of $SiO_2$ or $Al_2O_3$.

\* \* \* \* \*